Dec. 9, 1952 E. WENNERBO ET AL 2,621,048

RECORD CHANGING PHONOGRAPH

Filed April 5, 1949

INVENTORS
ERIK WENNERBO
FRITZ A. SVENSSON
BY: Young, Emery & Thompson Attys.

Patented Dec. 9, 1952 2,621,048

UNITED STATES PATENT OFFICE 2,621,048

RECORD CHANGING PHONOGRAPH

Erik Wennerbo and Fritz August Svensson, Motala, Sweden, assignors to Axel Harold Holstensson, Motala, Sweden Application April 5, 1949, Serial No. 85,696
In Sweden April 6, 1948

5 Claims. (Cl. 274—10)

Figures 1, 2, 3, 4:
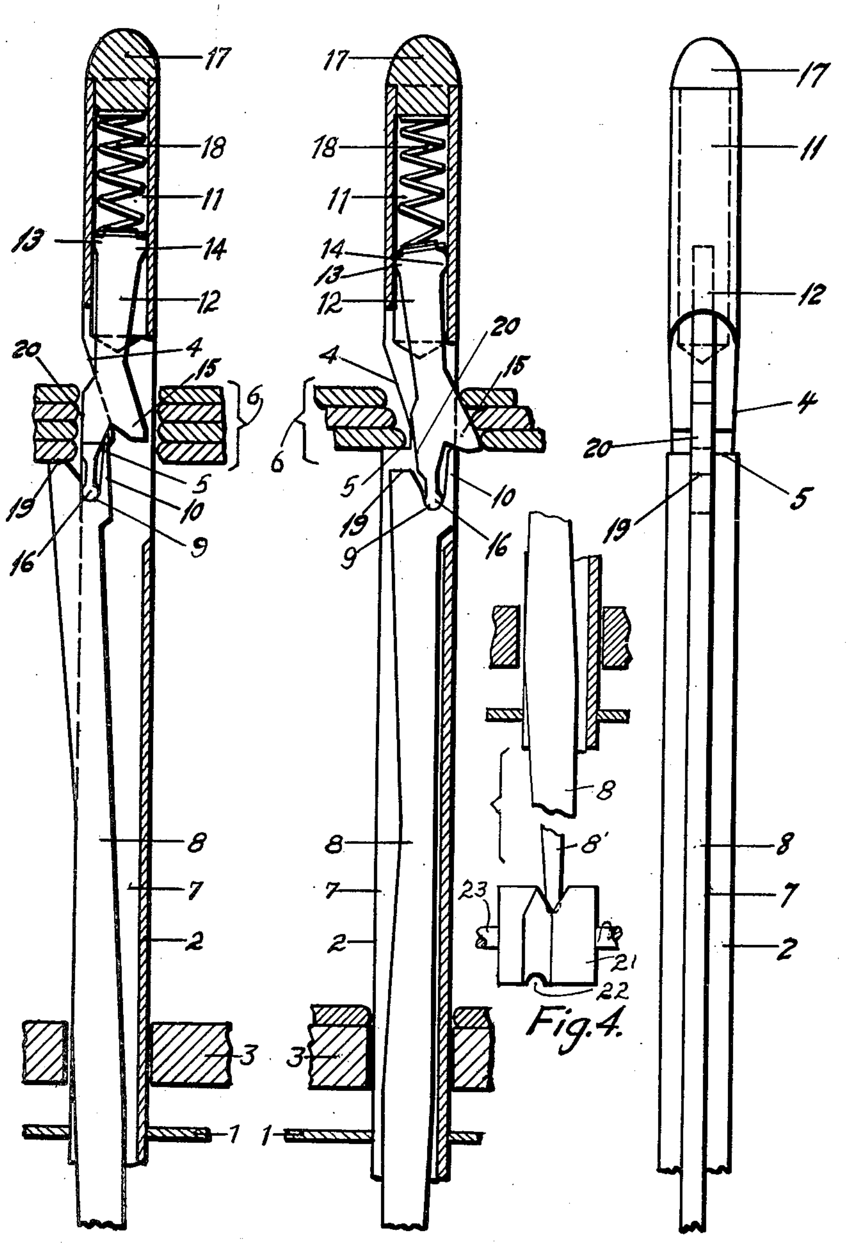

The present invention relates to record changing phonographs of the kind having a centering pin projecting from the turntable, in which centering pin there is formed, or in combination with which there is arranged, a supporting member for carrying a stack of records to be played, through the central apertures of which records extends that portion of the centering pin which is situated above the supporting member, said portion being rigidly connected with that portion of the centering pin which is situated beneath the supporting member, in which latter portion there is mounted a record changing member, which under the influence of the record changing mechanism of the phonograph brings down the lowermost record of the stack from its position of readiness on the supporting member into playing position on the turntable, a stop member being provided to prevent a lowering of the remaining records of the stacks into playing position on the turntable.

Hitherto known record changers of this kind have been provided with a centering pin formed with an offset upper portion, a record supporting shelf being thus formed on which the stack of records rests, the offset portion passing through the central apertures of all records of the stack except the lowermost one. By means of a displacing member mounted in the lower portion of the centering pin the lowermost record of the stack may be laterally displaced, whereby it loses its support on the shelf and falls down on to the turntable in order to be played. The other records of the stack are prevented from participating in the lateral displacement by the offset portion of the centering pin.

Another known record changing construction has a centering pin whose upper portion, which passes through the central apertures of the records of the stack, is rigidly secured to a release member mounted in the lower portion and on which the stack of records rests, both portions of the centering pin being normally concentrically arranged relatively one another. During the change of records the release member is turned into a position inside the periphery of the lower portion of the centering pin, the lowermost record thereby losing its support and falling down on to the turntable at the same time as the remaining records are prevented from falling down on to the turntable by the upper portion of the centering pin being displaced to a position which is eccentrical relatively to that of the lower portion of the centering pin. In these known constructions it has been necessary to make the centering pin removable in order to enable the removal of the played records from the turntable, the upper portion of the centering pin preventing a removal of the records from the turntable simply by moving the same upwards along the centering pin.

The present invention may be said to constitute a combination of these two known constructions, in which the upper portion of the centering pin is formed rigid with the lower portion of the centering pin and in which at the same time the member preventing a lowering of all records except the lowermost one into playing position on the turntable is arranged to be movable in dependence of the movements of the release member.

Through this new construction it is possible to form the upper portion of the centering pin as a concentric continuation of the lower portion, the manufacture of the centering pin being thereby simplified. By a special arrangement of the member preventing the lowering of the records of the stack on to the turntable it is also made possible to remove the played records from the turntable without having to remove the centering pin.

The invention is characterized by the fact that the stop member is movably arranged and is adapted in dependence of the movements of the record changing member to be moved between two end positions, one of which is a position (active position), wherein the stop member by being located outside the periphery of the upper portion of the centering pin during a record changing operation prevents the lowering into playing position of all records of the stack except the lowermost record, and the second of which is a position (inactive position), wherein the stop member is located inside the periphery of the upper portion of the centering pin.

The invention is more particularly described in the following with reference to the drawing, in which one embodiment of the invention is illustrated in three figures.

Figure 1 is a side view of the device in one operative position, and Figure 2 shows the device according to Figure 1 in another operative position. Figure 3 is a front view of the device. Figure 4 is a side elevation partly in section showing the rod and cam wheel.

In the drawing reference character 1 designates a bottom plate forming part of the phonograph with a centering pin 2 secured thereto. A turntable 3 is mounted to rotate around the said centering pin. The latter is provided with a recess 4, the lower portion of which is plane and extends perpendicularly to the longitudinal direction of the centering pin, thereby forming a shelf 5 adapted to temporarily support a stack of records 6. In the centering pin from the recess 4 and downwards there is cut a groove 7, in which a rod 8 is displaceably and rockably mounted. At its upper end the rod 8 terminates in a plane supporting surface 19, a recess 9, and a projection 10 extending to the right.

Above the recess 4 the centering pin is provided with a bore 11, in which an arm 12 is mounted to turn around two circular portions 13 and 14 formed on the upper end of the arm 12. At its lower end the arm 12 is provided with a projection 15 and a downwardly extending pin 16. At the upper end of the centering pin 2 a top piece 17 is knocked down into the bore. A coil spring 18 mounted in the bore 11 abuts against the said top piece with its one end against the upper end of the arm 12 with its other end and thus urges the latter downwardly, the pin 16 of the arm 12 normally engaging the recess 9 of the rod 8.

The device now described operates in the following manner, it being supposed that the various elements normally assume the positions shown in Figure 1. The rod 8 then, by a record changing mechanism not shown, has moved into a position in which its supporting surface 19 is located outside the periphery of the centering pin 2 and at a distance beneath the shelf 5 that corresponds to, or is somewhat lesser than, the thickness of a record. The stack of records 6 rests on the supporting surface 19. The arm 12, the position of which, due to the cooperation between the pin 16 and the recess 9 of the rod 8, depends on the position of the rod 8, now assumes such a position that the projection 15 is situated within the periphery of the centering pin with the recess 4 of the rod 8 wholly covered by the arm 12. This is enabled thereby that the groove 7 right in front of the recess 4 extends all through the centering pin 2, as shown in the figures, a projection 20 on the arm 12 corresponding to the said groove in the left wall of the pin as shown in Figures 1 and 2.

At the change of records the record changing mechanism turns the rod 8 in clockwise direction so that the supporting surface 19 is moved into a position inside of the centering pin. The lowermost record hereby loses its support and falls down onto the turntable 3. This turning movement of the rod 8 also causes the arm 12 to turn in counterclockwise direction so that the projection 15 protrudes outside the periphery of the centering pin, thereby displacing the record next to the lowermost record, as well as those records situated in front of the recess 4, to the right into the said recess 4 (Figure 2), and thus no other records than the lowermost one are allowed to fall down onto the turntable.

After the lowermost record has fallen down onto the turntable the now lowermost, laterally displaced record as well as records above the same will fall down onto and be supported by the shelf 5.

Under the influence of the record changing mechanism the rod 8 is then raised, thereby causing the support 19 to contact the underside of the lowermost record of the stack resting on the shelf 5 and, at continued upward movement, to raise the stack somewhat above the shelf 5. The rod 8 is then turned in a counterclockwise direction by the record changing mechanism until the support 19 assumes a position outside the periphery of the centering pin, also the records previously displaced to the right being now moved back to the left by the projection 20 of the arm 12 so that the edges of the central apertures of all records are located outside the periphery of the centering pin.

The record changing mechanism then imparts a lowering movement to the rod 8 so that the lowermost record is passed on to that portion of the centering pin which is situated beneath the shelf 5, the other records of the stack participating in such movement. The rod 8 is lowered until the details have returned to the positions shown in Figure 1.

In order that the phonograph may be automatically stopped when the last record of the stack has been brought down, the rod 8 may be so arranged that, when a record is resting on the support 19, the rod 8 normally assumes the position according to Figure 1 against the influence of a rather weak spring, which, when all records have been lowered onto the turntable, imparts to the rod 8 a position somewhat higher than the normal position, which change of position is utilized to actuate some stop means for bringing the phonograph to a stand still.

In the case described above it has been supposed that the normal position of the device is that shown in Figure 1. The device may, of course, be so arranged that the normal position of the same will be that shown in Figure 2, the stack of records 6 then resting on the shelf 5. At a change of records the rod is then first raised so that the support 19 lifts the stack of records 6 from the shelf 5. The rod 8 is then turned in counterclockwise direction and, by the action of the projection 20 of the arm 12, imparts to the records displaced to the right a movement to the left in the same manner as previously described. At a lowering of the rod 8 then following the stack of records 6 is lowered and the lowermost record is passed on to the centering pin beneath the shelf 5. The various details now assume the positions according to Figure 1. The rod 8 is then turned in clockwise direction to the position shown in Figure 2, the lowermost record being thereby released to fall down on to the turntable, while the record next to the lowermost record and those records situated right in front of the recess 4 are displaced to the right into the recess 4 by the action of the projection 15. After the lowermost record has fallen down on to the turntable the lowermost displaced record and the records above the same will fall down on to and be supported by the shelf 5.

Instead of arranging the rod to be turned as well as raised and lowered, the same may, of course, be made only to turn between the positions shown in Figures 1 and 2. Such arrangement, however, would involve the drawback that the stack of records would have to fall from the shelf 5 down on to the support 19, which means that the change of records would be more noisy than with the arrangement according to the embodiment previously described. Furthermore, before such fall the lowermost record of the stack when being displaced into concentricity with the centering pin would have to slide with friction against the shelf 5 and to slide over the edge of the shelf under the weight of all records. This means that the central apertures of the records might easily be damaged.

When all records have been brought down on to the turntable by the described device, the details of which normally assume the positions according to Figure 1, and the played records are to be removed from the turntable this is effected by lifting the records along the centering pin 2. The records will then press the rod 8 inwards against the action of a spring, not shown, of the record changing mechanism so that the entire rod 8 will be located within the periphery of the centering pin. At the same time, however, the projection 15 is moved into a position outside the periphery of the centering pin 2, so that the uppermost record at the continued lifting of the records will contact the lower edge of the projection 15, thereby moving the arm 12 upward against the action of the spring 18. At the raising of the arm 12 an upper, oblique edge of the projection 15 strikes against the right wall of the centering pin, whereby the arm, at the same time as it is raised, is turned in clockwise direction until the projection 15 is located entirely inside the periphery of the centering pin, the records being thus free to be removed from the centering pin When, after the removal of the records, the same no longer actuate the rod 8, the latter returns to the normal position under the influence of the above mentioned spring, not shown, of the record changing mechanism. Therefore, when the arm 12, after having been turned in clockwise direction so far that the projection 15 is located inside the periphery of the centering pin, is urged downwards by the spring 18, the pin 16 of the arm 12 will enter the recess 9 of the rod 8, these two members being thus reconnected.

If the device is of the kind normally assuming the position shown in Figure 2, it is advisable to provide a guide for the arm 12 in order that the same, after the raising and turning caused by the removal of the records, automatically returns to the position according to Figure 2.

Figure 4 shows diagrammatically the cooperation of the rod 8 controlled and actuated by a cam wheel in which the rod 8, 8′ cooperates with a groove 22 in the cam wheel 21, the latter being mounted on a shaft 23 so that upon rotation of the latter, the rod is actuated accordingly.

Many other embodiments are, of course, possible within the scope of the invention, as disclosed in the claims.

What we claim is:

1. A record changing device for the turntable of phonographs comprising a non-removable and straight centering pin having a shoulder portion forming a first temporary support for a stack of records at their centers, said centering pin extending upwardly through an opening in the center of each record and having a first longitudinal recess above said shoulder and a second longitudinal recess below said shoulder, a slide member slidably and rockably mounted in said first recess and a rod rotatably mounted in said second recess, the upper end of said rod being formed as a second temporary support for the unplayed stack of records when the rod is swung to a position in which said second support is outside the periphery of said centering pin, said slide member being provided with a lateral projection opposite said second support, the lower end of the projection being located a distance above said second support at least equal to the thickness of a phonograph record, the lower end of said slide member being normally connected to the upper end of said rod for taking part in the swinging motions of said rod, so that when said rod is in the position in which said second support is outside the periphery of the centering pin holding the stack of records, the slide member by the rod has been brought to a position where the lateral projection on the slide member is inside said periphery, whereas when the rod is swung in the opposite direction to a position with the second support inside the periphery of the centering pin, the slide member by the rod is brought to a position, where the lateral projection on the slide member is outside said periphery displacing the whole stack of records except the lowermost record, moving the stack in on said first support and the lowermost record being released to fall down on said turntable, said slide member being disconnected from the rod and swung to a position with the lateral projection inside the periphery of the centering pin when pushed upwardly in said first recess by a record removed from said turntable.

2. A record changing device according to claim 1, in which a cam mechanism is provided and in which the rod besides being swingably mounted in said second recess in the centering pin also is movable in a longitudinal direction in said recess and adapted to cooperate with said cam mechanism, which after a record has been brought to fall down onto the turntable causes the rod to raise thereby lifting the stack of records from the first support and then causes the rod to swing thereby displacing the stack of records laterally clear of said first support.

3. A record changing device according to claim 1, in which the slide member is slidably mounted in the upper portion of the centering pin against the action of a spring.

4. A record changing device according to claim 1, in which a downward projection is provided on the slide member and in which the rod is provided with a recess in its upper end into which recess the downward projection extends.

5. A record changing device according to claim 1, in which the lateral projection on the slide member is formed with a cam surface to cooperate with the walls of the first recess in the centering pin to automatically turn said slide member into a position with the lateral projection inside the periphery of the centering pin, when the slide member is pushed upward.

ERIK WENNERBO.
FRITZ AUGUST SVENSSON.

REFERENCES CITED

The following references are of record in the file of this patent:

UNITED STATES PATENTS

| Number | Name | Date |
|---|---|---|
| 2,287,098 | Habegger | June 23, 1942 |

FOREIGN PATENTS

| Number | Country | Date |
|---|---|---|
| 64,176 | Denmark | Dec. 17, 1945 |
| 64,209 | Denmark | Jan. 2, 1946 |